United States Patent [19]

Carden et al.

[11] Patent Number: 5,202,943
[45] Date of Patent: Apr. 13, 1993

[54] OPTOELECTRONIC ASSEMBLY WITH ALIGNMENT MEMBER

[75] Inventors: Gary R. Carden, Endwell, N.Y.;
David H. Danovitch, Quebec,
Canada; Eric M. Foster, Owego;
William W. Vetter, Vestal, both of
N.Y.

[73] Assignee: International Business Machines Corporation, Armonk, N.Y.

[21] Appl. No.: 771,904

[22] Filed: Oct. 4, 1991

[51] Int. Cl.⁵ .................... G02B 6/00; G02B 6/36
[52] U.S. Cl. ........................................ 385/92
[58] Field of Search ................ 250/227; 385/90–95

[56] References Cited

U.S. PATENT DOCUMENTS

| | | | |
|---|---|---|---|
| 4,072,399 | 2/1978 | Love | 350/96.16 |
| 4,092,697 | 5/1978 | Spaight | 361/386 |
| 4,249,265 | 2/1981 | Coester | 455/604 |
| 4,273,413 | 6/1981 | Bendiksen et al. | 350/96.20 |
| 4,301,543 | 11/1981 | Palmer | 455/612 |
| 4,396,935 | 8/1983 | Schuck | 357/74 |
| 4,427,879 | 1/1984 | Becher et al. | 250/215 |
| 4,442,450 | 4/1984 | Lipschutz et al. | 357/81 |
| 4,479,140 | 10/1984 | Horvath | 357/81 |
| 4,483,389 | 11/1984 | Balderes et al. | 165/80 |
| 4,547,039 | 10/1985 | Caron et al. | 350/96.20 |
| 4,549,314 | 10/1985 | Masuda et al. | 455/618 |
| 4,611,886 | 9/1986 | Cline et al. | 350/96.20 |
| 4,625,333 | 11/1986 | Takezawa et al. | 455/612 |
| 4,647,148 | 3/1987 | Katagiri | 350/96.20 |
| 4,707,067 | 11/1987 | Haberland et al. | 350/96.20 |
| 4,709,414 | 11/1987 | So et al. | 455/607 |
| 4,719,358 | 1/1988 | Matsumoto et al. | 251/604 |
| 4,736,448 | 4/1988 | Cohen et al. | 370/3 |
| 4,737,008 | 4/1988 | Ohyama et al. | 350/96.20 |
| 4,753,508 | 6/1988 | Meuleman | 350/96.20 |
| 4,755,017 | 7/1988 | Kapany | 350/96.18 |
| 4,762,388 | 8/1988 | Tanaka et al. | 350/96.20 |
| 4,767,171 | 8/1988 | Keil et al. | 350/96.18 |
| 4,770,242 | 9/1988 | Daikoku et al. | 165/185 |
| 4,783,137 | 11/1988 | Kosman et al. | 350/96.15 |
| 4,798,440 | 1/1989 | Hoffer et al. | 350/96.20 |
| 4,807,956 | 2/1989 | Tournereau et al. | 350/96.20 |
| 4,912,521 | 3/1990 | Almquist et al. | 455/600 |
| 4,977,593 | 12/1990 | Ballance | 380/2 |
| 5,005,939 | 4/1991 | Arvanitakis et al. | 350/96.20 |

FOREIGN PATENT DOCUMENTS 0350207 10/1990 European Pat. Off. .
3437904 4/1986 Fed. Rep. of Germany .

*Primary Examiner*—Akm E. Ullah
*Attorney, Agent, or Firm*—Judith D. Olsen; Lawrence R. Fraley

[57] ABSTRACT

An optoelectronic assembly which provides for enhanced alignment between the internal components thereof. The assembly includes a housing having a base portion and a cover portion, the housing including therein a circuitized substrate. A pair of optoelectronic devices (transmitter and receiver components) are initially movably (loosely) positioned within the housing. The invention utilizes an alignment member which is secured to the housing while positively engaging the movably positioned devices and precisely align these devices with respect thereto such that these devices are in turn precisely aligned with optic means (e.g., a duplex optical connector) when the optic means is positioned within the alignment member. In one embodiment, the housing is of metallic material while the alignment member is a molded plastic structure. The alignment member may also include shutter means therein for safety purposes.

23 Claims, 4 Drawing Sheets 5,202,943

OPTOELECTRONIC ASSEMBLY WITH ALIGNMENT MEMBER

TECHNICAL FIELD

The invention relates to optoelectronic data transmission and particularly to optoelectronic assemblies for providing same. Even more particularly, the invention relates to such assemblies for use in information handling systems (computers) and the like.

BACKGROUND

Users of information handling systems have become extremely interested in the utilization of optoelectronics as a means for transmitting data information. Advantages of using optical fibers over other kinds of transmission media (e.g., electrical wiring) are well known. For example, optical systems are highly resistant to electromagnetic interference which occasionally plagues systems using electrical cables. Additionally, optical systems are considered more secure than known electrical systems since it is substantially more difficult for unauthorized personnel to tap or access an optical fiber without being detected.

As is further known, optical fibers transmit data information using single or multiple strands of fibers each having an inner circular glass core coated with a circumferential cladding having a different index of refraction from that of the core. Light is transmitted along the core and reflected internally at the cladding. Transmissions lines (e.g., optical fibers) used in information handling systems known today are formed of either a single fiber or a plurality (bundle) of such fibers encased within a protective sheath. As also known, such fibers are coupled to various fiber optic connector assemblies and utilized within computers in selected manners.

In U.S. Pat. No. 5,005,939 (Arvanitakis et al), assigned to the same assignee as the present invention, there is defined an optoelectronic assembly which provides bidirectional data transmission between fiber optic means (e.g., optical fibers) and an electrically conducting circuit member (e.g. printed circuit board) which in turn may form part of a larger, overall information processor (e.g., computer). This assembly thus serves to link fiber optic communication apparatus with electrical information processing apparatus and thus obtain the advantages associated with optical fiber transmission (e.g., as stated above). Examples of other means for providing connections between optical fiber means (e.g., cables) and electronic circuitry are illustrated in U.S. Pat. Nos. 4,273,413 (Bendiksen et al), 4,547,039 (Caron et al), 4,647,148 (Katagiri) and 4,707,067 (Haberland et al).

As will be understood from the following, the present invention represents an improvement to optoelectronic assemblies of the type particularly defined in U.S. Pat. No. 5,005,939 wherein optoelectronic devices are contained within a housing that in turn provides some means of connection to the associated fiber optic means. In U.S. Pat. No. 5,005,939, a preferred means for such connection is to utilize either an extension section of the housing designed to receive a fiber optic connector (e.g., what is referred to as a duplex connector) or to align and couple individual fiber optic connectors to respective optoelectronic devices (e.g., by a threaded end coupling). The devices, in turn, are securedly retained within the assembly's housing in fixed alignment therewith. The teachings of U.S. Pat. No. 5,005,939 are incorporated herein by reference.

In accordance with the teachings herein, there is provided an improved optoelectronic assembly wherein enhanced means is provided for assuring precise alignment between the optoelectronic device(s) housed in the assembly's housing and the associated fiber optic connectors. Such enhancement is assured by utilization of a separate, individual alignment member which, in turn, is precisely aligned relative to the assembly's housing and which is designed to accommodate either associated pairs of singular fiber optic connectors or such connectors of the duplex variety therein. Significantly, the alignment member enables the device(s) to be relatively "loosely" positioned initially within the housing (thereby reducing heretofore relatively high tolerance controls at this stage of assembly) and thereafter engages the device(s) to assure precise housing-device(s) alignment. Because the alignment member is precisely aligned relative to the housing after being positioned therein, precise device(s) and fiber optic connector alignment is thus provided. The invention as defined further below thus provides such enhanced alignment and does so in a manner which facilitates ease of assembly and, if necessary, eventual repair and/or replacement of various parts of the invention.

It is believed that an improved optoelectronic assembly possessing the above and other advantageous features would constitute a significant advancement in the art.

DISCLOSURE OF THE INVENTION

It is, therefore, a primary object of the present invention to enhance the data transmission art, and particularly the art involving data transmission between optical fibers and electrical processing components.

It is a more particular object of this invention to provide an improved optoelectronic assembly which possesses the several advantages cited above as well as others discernible from a reading of this disclosure.

In accordance with one aspect of the invention there is provided an improved optoelectronic assembly for providing bidirectional data transmission between fiber optic means (e.g., optical fiber members) and an electrical circuit member (e.g., printed circuit board), wherein the assembly includes a housing, a substrate member positioned in the housing and at least one optoelectronic device positioned in the housing and electrically coupled to the substrate. The invention's optoelectronic device is movably located in the housing (e.g., to facilitate assembly) prior to addition of an alignment member, which member positively engages the device when secured to the housing in fixed alignment therewith to, in turn, securedly position the device in fixed alignment in the alignment member.

BEST MODE FOR CARRYING OUT THE INVENTION

For a better understanding of the present invention, together with other and further objects, advantages and capabilities thereof, reference is made to the following disclosure and appended claims in connection with the above described drawings.

Figure 1:
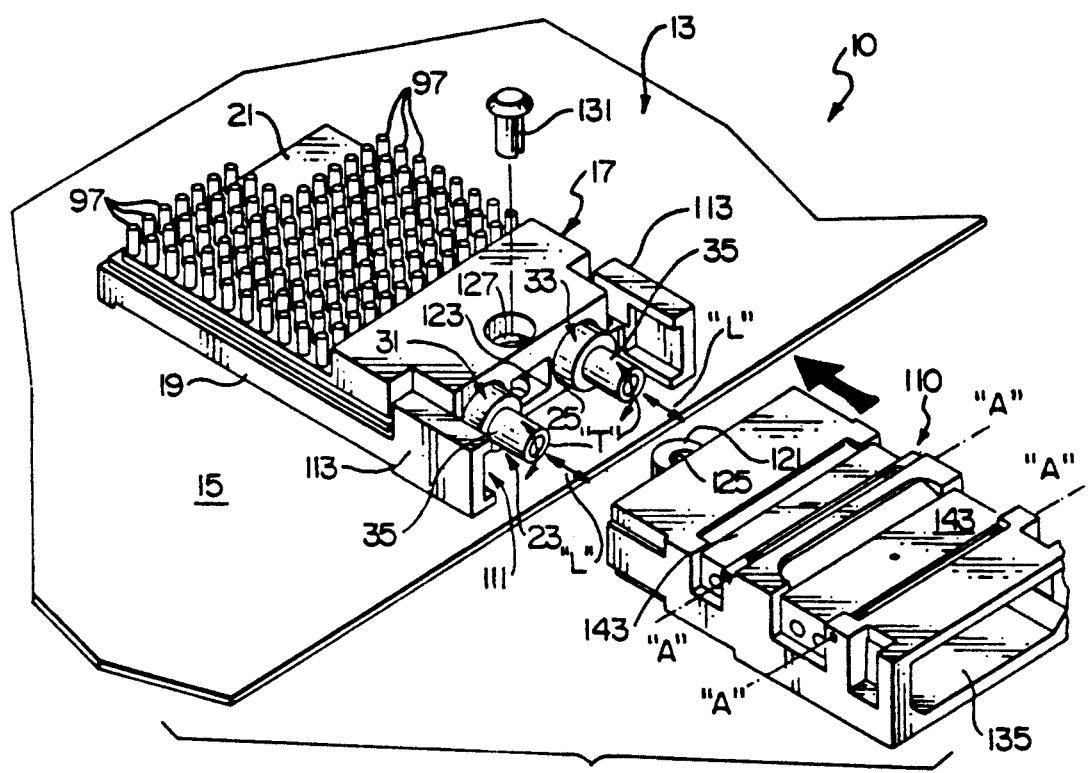
FIG. 1 is an exploded perspective view of an optoelectronic assembly in accordance with one embodiment of the invention, the assembly shown capable of providing interconnection between two optical fiber members and an electrical circuit member.

In FIG. 1, there is shown an optoelectronic assembly 10 in accordance with one embodiment of the invention. Assembly 10, like the assembly defined in U.S. Pat. No. 5,005,939, is designed for providing bidirectional data transmission between fiber optic means 11 (FIG. 2) and an electrical circuit member 13 (e.g., printed circuit board 15). As such, assembly 10 thus provides an interconnection between optic means 11 wherein optical inputs are provided and an electrical conductor wherein converted optical signals are processed. By way of example, circuit member 13 may form part of a larger information handling system (computer) of a type known in the art. The circuit member 13 may be electrically connected to the remaining electrical circuitry of such a processor by known connection means (e.g., a circuit board connector of the zero insertion force variety). As further defined, assembly 10 receives optical input from optic means 11 and converts said input to electrical signals for subsequent processing (e.g., by the process to which the circuit member 13 is electrically connected). Assembly 10 further provides means whereby electrical signals from the processor are converted to optical signals and transmitted out through optic means 11.

Figure 2:
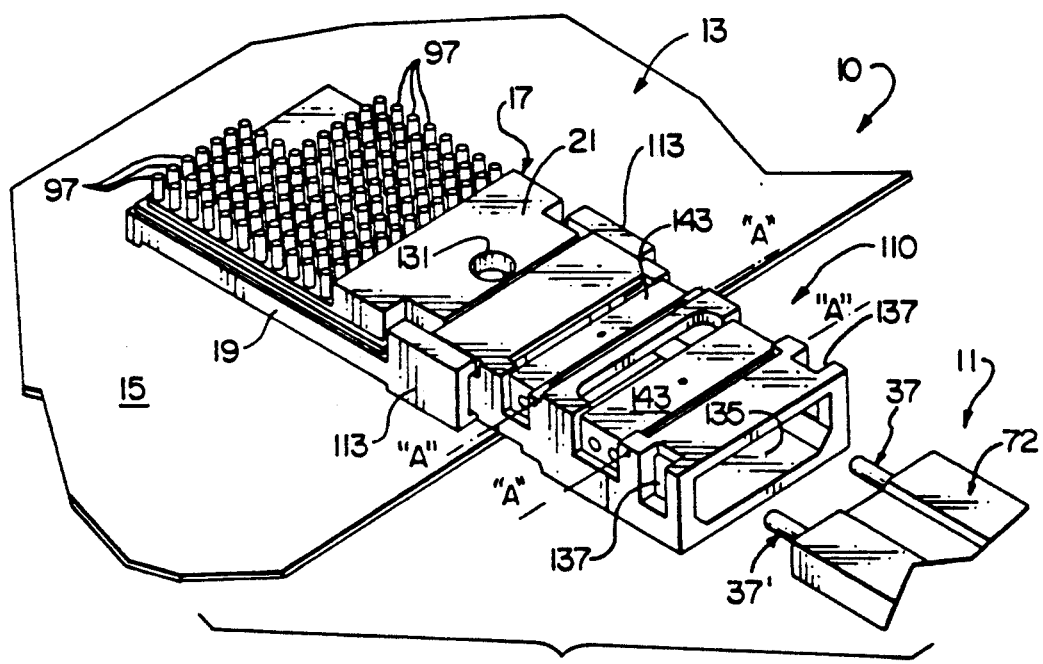
FIG. 2 is an assembled view of the assembly of FIG. 1, about to receive a fiber optic connector therein.
Figure 3:
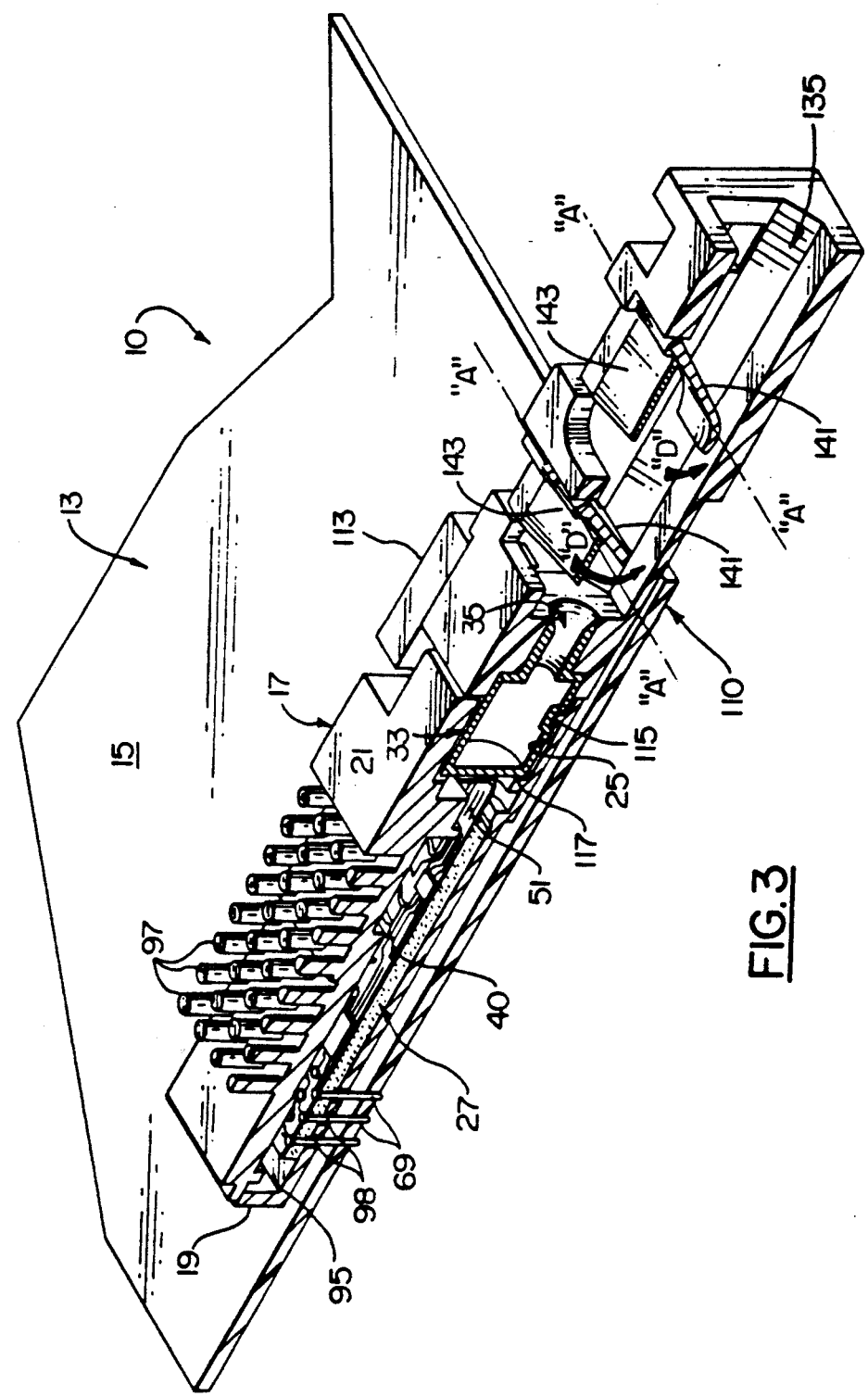
FIG. 3 is a partial perspective view, in cross-section and on an enlarged scale over the view in FIG. 2, showing the assembled invention of FIG. 2.

The assembly of FIG. 1 (including FIGS. 2-4), like that of the assembly in U.S. Pat. No. 5,005,939, includes a housing 17 of two-part construction. Housing 17 is preferably metallic (e.g., stainless steel, aluminum, or copper) and includes a base portion 19 and a cover portion 21 designed for being secured to the base portion 19 (see, e.g., FIG. 3). Base portion 19, of substantially rectangular configuration, includes a pair of receptacle portions 23 and 25 of substantially semicylindrical configuration. Each of these receptacle portions is designed for accommodating a respective optoelectronic device to thus position the devices within housing 17. Significantly, the devices are initially loosely (or movably) located within the respective receptacles, unlike the arrangement defined in U.S. Pat. No. 5,005,939. By the term movably is meant that each device (to be defined in greater detail below) is capable of minor lateral motion (directions "L" in FIG. 1) as well as some minor "tilting" (directions "T" in FIG. 1) because of the relatively loose fit. Such a fit results even when the cover portion 21 is attached to base portion 19. Base portion 19, as shown in FIG. 3, is designed for resting atop an upper surface of circuit board 15 when assembly 10 is joined thereto. Each of the illustrated receptacle portions in base portion 19, as stated, is of substantially semicylindrical configuration. Further, these receptacle portions lie substantially parallel to one another and are spaced slightly apart in base portion 19. As also stated, each receptacle portion is designed for having one of the invention's optoelectronic devices positioned therein. These devices are represented by the numerals 31 and 33 in the drawings. Only device 33 is shown in the partial view of FIG. 3. Each device, as shown, includes a substantially cylindrical container for its outer housing and includes therein the necessary components (not shown) to satisfactorily perform the functions required. In FIG. 1, device 31, designed for being positioned within receptacle portion 23, is adapted for receiving electrical data signals from respective circuitry on a substrate member 27 (FIG. 3) and for converting these electrical signals to optical data signals for transmittance through a respective optical fiber member 37' connected thereto when optic means (which includes two such fiber members 37 and 37') is connected, optically, to assembly 10. Such an optical fiber member may be one currently available in the art and which may include a suitable connector end 39' (as in the embodiment of FIG. 4) or, alternatively, be located within a common housing 72 (also known as a duplex housing), as is known in the art. Such a duplex connector housing is depicted in FIG. 1. Further description of this optical fiber component is thus not deemed necessary. It is understood, however, that such a component will include at least one optical fiber therein having an end section (e.g., ferrule) which is designed for being strategically positioned within device 31 in precise alignment with a respective element therein.

Substrate 27 may comprise a substantially similar structure to that in U.S. Pat. No. 5,005,939, or may include enhanced circuitization thereon for providing greater operational capability over the member defined in U.S. Pat. 5,005,939. Further definition of this part of the invention, except as provided below, is thus not believed necessary to an understanding of this invention.

Device 31, like the similar device in U.S. Pat. No. 5,005,939, serves as a transducer for converting electrical signals from substrate member 27 to desired optical data for passage outwardly through fiber 37'. In this capacity, device 31 serves as a transmitter of optical signals to optical fiber 37'. Preferably, device 31 comprises a light emitting diode (LED) or a laser (not shown), both of which may be of known construction. Typically, a complete optoelectronic device of this type includes a die (semiconductor) which comprises an emitter, a header for providing mechanical support to the emitter, a lens for focusing light output generated by the LED or laser, and suitable electrical connections (illustrated in the drawings as a flexible cable member 51 (FIG. 3)). Device 31 is particularly designed for receiving parallel data from the information system to which circuit member 15 is connected, said parallel data being serialized by an appropriate serializer (not shown) and then supplied directly to device 31 by the flat cable member 51. Electrical interconnection between device 31 and the circuitry which forms part of circuit member 15 (see FIG. 5) is provided by substrate 27. Specifically, substrate 27 includes various circuitized sections, each including appropriate circuitry and discreet devices, including at least one semiconductor chip as part thereof, each section designed for a respective one of the devices 31 or 33. The circuitry of each circuitized section is electrically connected to respective conductive pins 69 (only three shown in FIGS. 3 and 6) which project from beneath the substrate and are designed for being electrically connected to circuit board 15 in a manner defined in U.S. Pat. No. 5,005,939.

Figure 7:
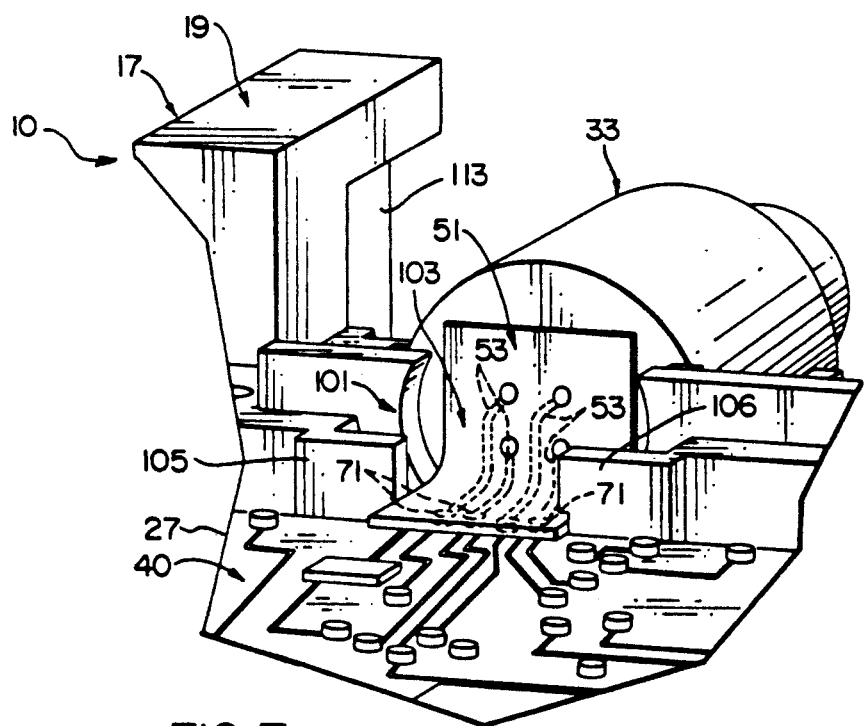
FIG. 7 is a partial perspective view, on a much enlarged scale, illustrating one of the optoelectronic devices of the invention as being electrically coupled to the invention's substrate.

Accordingly, the circuitry of one circuitized section serves to appropriately connect respective circuitry within board 15 to the conductive wiring (e.g., wiring 53 in FIG. 7) of flat, flexible cable 51 (FIG. 7) associated with one of the devices 31 or 33, this wiring preferably secured to appropriate circuit elements (e.g., conductor pads 71) found on the upper surface of substrate 27. Even more particularly, each projection end of cable 51 is soldered to these pads to provide the appropriate electrical connections at this location in the invention.

As further shown in FIG. 1, optoelectronic assembly 10 further includes the second optoelectronic device 33 which, similarly to the first device 31, is initially loosely positioned within base portion 19 of the invention's housing and designed for being electrically connected (through its own flexible cable member) to its own circuitized section of substrate 27. Such an electrical connection between the device and respective circuitry is preferably achieved in a similar fashion to that for device 31. The circuitry of the substrate's circuitized section is located on an upper surface of the dielectric (e.g., ceramic) substrate of member 27 and is electrically coupled to conductive pins 69. Thus, these pins are also utilized to electrically connect the circuitry at this portion of substrate member 27 with corresponding circuitry within/upon board 15. Device 33, similar to device 33 in U.S. Pat. No. 5,005,939, is designed for receiving optical data signals from a second optical fiber 37, which, like optical fiber 37', includes a connector 39' or the like at the end thereof (if of the single connector variety as in FIG. 4) as well as a projection end (ferrule) for being precisely aligned within an end portion of the container 35 of device 33 (FIG. 3). If a duplex connector is used (FIG. 2), both optical fibers and associated projection ends are contained in the duplex housing as depicted in FIG. 2.

Similar to device 33 in U.S. Pat. No. 5,005,939, device 33 includes therein a die which functions as a detector, a header for mechanical support, a lens for focusing the optical input onto the device's die, and a flexible, flat cable member 51 to provide the aforementioned electrical connections. The die as used herein, like the die used in device 31, may comprise any suitable material for the emission or detection of photons (depending on the function described), including silicon or gallium arsenide. Such components are known in the art and further description is thus not believed necessary. More particularly, the respective die may be located on the aforementioned header member which in turn may include the projecting cable 51 connected thereto and/or projecting therefrom. Device 33, in addition to being a transducer as is device 31, thus functions as a receiver of optical data signals (from fiber member 37) and provides the function of converting these incoming signals from the optical fiber to electrical data signals for passage (transmittance) to the designated circuitized section of the ceramic substrate member 27. Preferably, the internal circuitry of device 33 further includes amplification circuitry for amplifying the relatively weak electrical signals prior to subsequent transmission. Further, these signals are also deserialized (by appropriate circuitry, not shown) in order to provide parallel data output through board 15. Such amplification and deserialization may be accomplished using known electrical components and further description is thus believed not necessary. However, it is to be understood that this circuitry, particularly the deserializing portion, may be located on and form part of the circuitry of the substrates.

Figure 6:
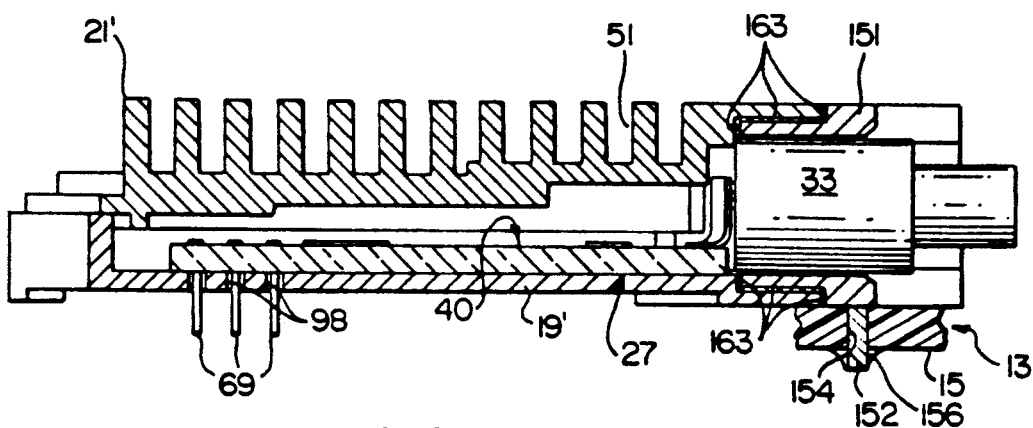
FIG. 6 is a side elevational view, in cross-section and on a scale larger than FIG. 5, of the assembly of FIG. 5, as assembled.

In FIG. 3 a much enlarged cross-sectional view, in elevation, of the assembly 10 of FIG. 1 is shown. It is also understood that this cross-section applies to the embodiment in FIG. 2. In FIG. 3, the cover portion 21 of housing 17 is shown as being secured to base portion 19 with one of the optoelectronic devices (33) positioned within the receptacle portion 25 defined by base portion (19) and the internal periphery of cover portion 21. Device 33 is shown in cross-section but excluding some of the various internal elements briefly mentioned elsewhere herein for clarification purposes. Both the base and cover include matching semicylindrical indentations which, when the housing is assembled, serve to define a pair of substantially cylindrical openings within the housing to loosely house both devices 31 and 33. Cover 21 may be secured to base portion 19 using a suitable adhesive (e.g., conductive epoxy). Preferably, the cover is welded or soldered to the base. When so attached, these two portions of housing 17 form a seal about the internal chamber 95 (FIG. 3) in which are positioned the invention3 s substrate and circuitry and assorted electronic components mounted thereon (e.g., die). To provide appropriate sinking for heat generated by such components, cover portion 21 is shown to also include heat sinking means 97 (e.g., a plurality of spaced, upstanding cylinders) therein. As stated above, housing 21 is of metallic material (e.g., aluminum, copper, and stainless steel) to thus further assure effective heat sinking. As also seen in FIG. 3, base portion 19 includes a plurality of holes 98 therein, each designed to accommodate a singular pin 69. These pins and holes are also shown in FIG. 6. Several such holes (e.g., in one embodiment, a total of about 150) may be provided, each to accommodate a respective pin.

Of added significance, initial positioning of pins 69 within provided holes 98 assists in locating substrate 27 (and, more importantly, the circuitry on the substrate) relative to the flexible cables 51 (defined more fully hereinbelow) prior to and during attachment of these cables to the substrate's circuitry. To assure electrical isolation of selected pins 69 from the metallic surfaces of the holes surrounding same, it is preferred to provide a quantity of dielectric material (e.g., epoxy) within these holes and about the pins. Such dielectric material is not shown in the drawings, for illustration purposes. For other, selected pins wherein electrical connection is desired to the housing's base portion (e.g., to provide electrical grounding for various circuit elements such as an internal ground plane of substrate 27 to which these pins may be electrically coupled), such connection is possible by an appropriate metallic bond (e.g., solder) formed within the holes containing such pins. A preferred method of forming such bonds is to use a wave solder operation, various types of which are known in the art.

Each pin 69 is preferably copper and inserts within (and is connected to, e.g., soldered) a corresponding conductive aperture or pad (not shown) within/upon board 15. Such apertures, if used, may comprise plated through holes (PTH) as are known in the printed circuit board art. Accordingly, the pins may be electrically coupled to respective layers of circuitry found within such a multilayered structure as described in greater detail in U.S. Pat. No. 5,005,939.

By the term pin as used herein is meant to include metallic elements of the configuration depicted herein as well as other conductive elements of different configurations (e.g., pad-shaped terminals adapted for being soldered or similarly joined to respective circuit members, including other pad-shaped conductors, located on the upper surface of substrate 27). Such pad-shaped conductors may be of copper or other highly conductive materials.

As described, the optoelectronic devices 31 and 33 of the invention are initially movably (loosely) positioned within the two portions (19, 21) that combine to form the housing shown in FIGS. 1-3. As also described, prior to combining both portions, the invention's circuitized substrate 27 has been securedly positioned within the base portion 19, with the designated pins 69 extending therefrom (and through the bottom wall of portion 19). Once accomplished, the optoelectronic devices 31 and 33, each having a respective flat, flexible cable 51 coupled thereto (as seen more clearly in FIG. 7) are loosely positioned within a respective receptacle portion provided in the base portion 19. The extending end segments of each cable 51 are then attached (e.g., soldered) to the respective circuitized area on the upper surface of substrate 27 such that circuit elements therein (e.g., 53 in FIG. 7) become individually connected to respective conductor pads (e.g., 71) or associated wiring which forms the upper, circuitized region 40. With particular attention to FIG. 7, the housing's base portion 19 is shown to include means 101 for engaging the extending end segment of the flexible cable to assist in holding this end in position during the aforementioned attachment procedure (e.g., soldering). This means for engagement preferably comprises an elongated slot 103 defined by a pair of upstanding sidewalls 105 and 106 of the base portion. The cable's projecting end segment is forced down through the elongated slot and held against the upper surface of substrate 27 in the manner shown in FIG. 7. Slot 103 as shown, is slightly narrower at the upper portion thereof and then opens to a width slightly larger than that of the tape in the area immediately above the substrate3 s upper surface. The clamping arrangement provided by these walls and internal slot serves to firmly align the flexible cable while still permitting desired attachment procedures.

With cables 51 attached as defined above, the next step in assembling the invention involves placement of the housing's cover portion 21 atop the base and contained substrate. As stated, the cover includes matching indentations therein to accommodate the devices 31 and 33 in the movable orientation desired.

Although not illustrated in the drawings, the invention3 s housing also preferably includes means for electrically isolating at least one of the circuit components (e.g., a semiconductor chip electrically coupled to device 33) from surrounding components (e.g., to provide RF shielding). Such shielding may be similar to that in 5,005,939 (see, e.g., column 7, lines 40-59), or, in another embodiment, be in the form of a conductive gasket (not shown) which is located on an internal surface of cover portion 21 so as to extend downwardly therefrom and substantially surround (along with other internal walls of the combined housing) the desired component being isolated. One example of such a conductive gasket material is silver-filled silicone, at least one type of which is commercially available.

In accordance with the teachings of this invention, assembly 10 further includes an alignment member 110 which, significantly, is designed for being secured to housing 17 in precise alignment therewith. That is, close tolerancing of the respective portions of these members is maintained. As shown in FIGS. 1-3, alignment member 110 is preferably of substantially rectangular, box-like configuration and is designed for being slidably positioned within a channel 111 defined by two protruding end segments 113 projecting from base portion 19. This internal channel, in one example of the invention, possessed an overall internal width of about 1.65 inch, to accept an alignment member 110 having an overall outer width of about 1.46 inch. Alignment member 110, as stated, is designed for being secured to housing 17 in precise alignment therewith. During insertion of member 110 within the defined channel, the forward portion of the alignment member physically engages the movably positioned devices 31 and 33 to "capture" the projecting end parts (the smaller protruding cylindrical portions in FIG. 1) therein. Such capture, in full, is best seen in the cross-sectional view of FIG. 3, where alignment member 110 is shown fully inserted within the defined channel 111 and secured to housing 17. With alignment member 110 so fully inserted, further movement of devices 31 and 33 is prevented. Rearward movement by these devices is preferably prevented through provision of an indentation 115 or the like within the housing's bottom portion to mate with a corresponding indentation within the device's cylindrical outer housing structure. Additional prevention of rearward movement may be also provided by various upstanding segments (e.g., 117) formed within the housing's portions. Close tolerancing is also maintained between the outer dimensions of those portions of each device which engage member 110 and the corresponding internal surfaces of member 110 which provide such engagement. These corresponding surfaces can best be seen in FIG. 3.

With alignment member 110 fully inserted within housing 17, attachment of the alignment member is then accomplished. This, in accordance with a preferred embodiment of the invention, is achieved by providing the alignment member 110 with a protruding portion 121 (FIG. 1) for mating with a corresponding opening 123 formed within housing 17 at a location between the spaced devices 31 and 33. Protruding portion 121, including an aperture 125 therein, is inserted within housing 17 until aperture 125 aligns precisely with a corresponding aperture 127 formed within the housing's cover portion relative to (above) opening 123. With both apertures precisely aligned, a plug 131 is pressed frictionally into both apertures to effect securement. The position of full alignment member insertion and securement is best seen in FIG. 2.

Figure 5:
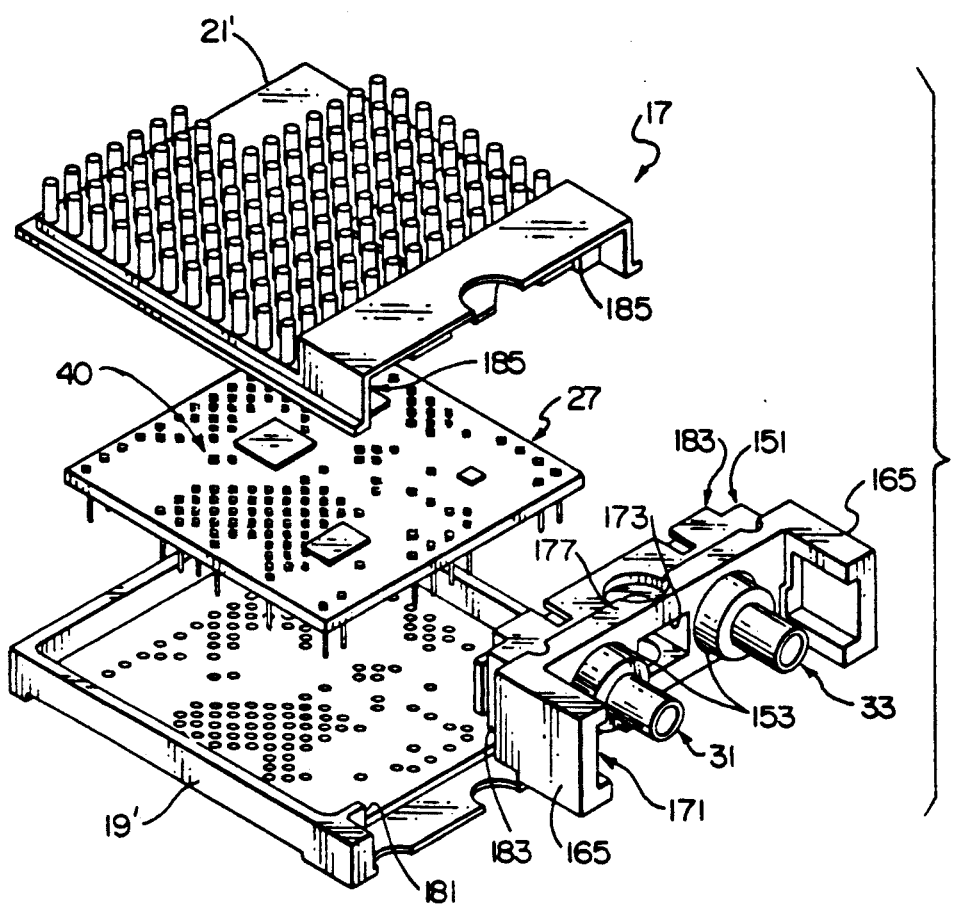
FIG. 5 is an exploded perspective view of an optoelectronic assembly in accordance with yet another embodiment of the invention.

By initially loosely positioning the invention's optoelectronic devices within the housing thereof, the invention thus facilitates assembly thereof while substantially minimizing the costs for this assembly and for various other components thereof. For example, reduced tolerancing between the housing's device receptacle portions is possible. In addition, electrical attachment of the optoelectronic devices to the respective circuitry on member 27 is greatly facilitated. Additional advantages of this arrangement are also understood from the teachings herein, including enhanced thermal protection between the invention's optoelectronic devices and the heat generating circuit components on substrate 27, said enhancements particularly provided by the three-part housing to be described below (FIGS. 5 and 6).

Alignment member 110 is designed for receiving optic means 11 therein and to align the optical fibers (and more particularly, projecting ferrules thereof) with the respective end portions of devices 31 and 35. Such alignment, understandably, is critical in order to assure optimum light output/input from the resulting connection, and to assure correct plugability. In the embodiment of FIG. 2, alignment member 110 is shown to include a singular orifice 135 into which the duplex housing 72 of optic means 11 is inserted. This latching element (not shown) may be incorporated to removably secure housing 72 in position. In one example, the housing 72 may include projecting latches (not shown) which in turn may mate with corresponding indentations (e.g., 137) formed within the outer side walls of member 110. Such latches are seen in U.S. Pat. No. 5,005,939. Orifice 135 extends through the entirety of member 110 and is best seen in FIG. 3. To prevent light passage from the invention when the optical connector is removed, alignment member 110 includes at least one (and preferably two) shutter member 141 which, as shown in FIG. 3, is biased downward (direction "D") to block such light when the connector has been withdrawn. In a preferred example, two aligned shutters 141 are used to provide redundancy and thus assure greater safety in operation. Shutters 141, as stated, are biased in a closed direction ("D"), this biasing preferably provided by curvilinear metallic springs 143 (only partially shown in FIG. 3) which depress downwardly on the pivoting shutters. The shutters each pivot about an axis located along the alignment member's upper surface. These axes of rotation are represented by the lines "A'-'-"A" in FIGS. 1-3.

Figure 4:
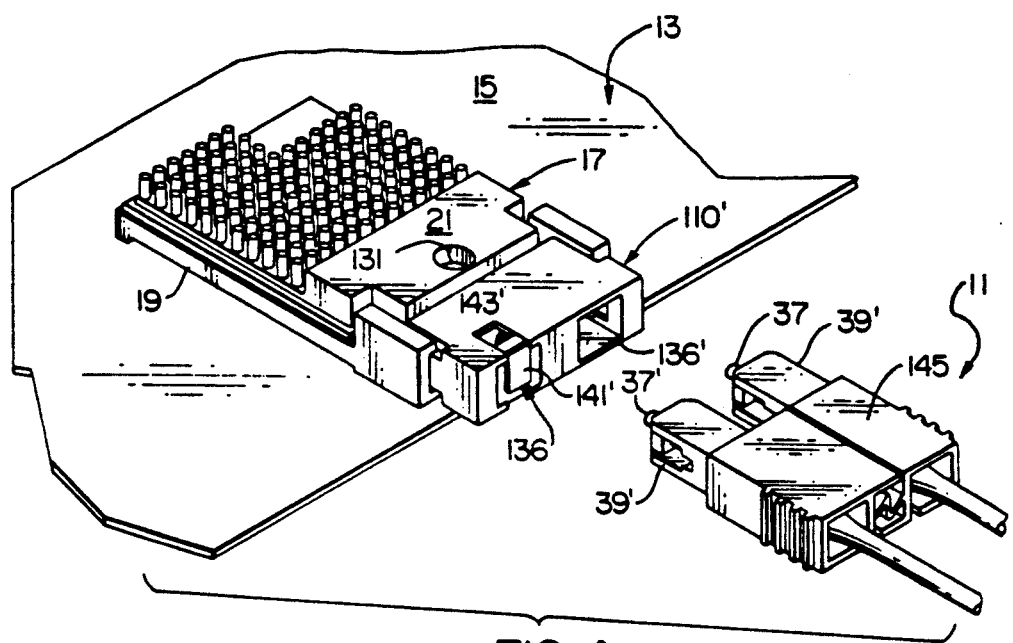
FIG. 4 is a perspective view of an optoelectronic assembly in accordance with another embodiment of the invention.

The embodiment of FIG. 4 comprises an alignment member 110' possessing two orifices 136 and 136', each designed for receiving a singular connector housing 39' therein. In the embodiment of FIG. 4, a pair of singular connectors 39' are shown for the optic means 11 which is to be connected to the invention. In this particular embodiment, a common adapter 145 may be utilized to accommodate both connectors in a side-by-side orientation therein. This is not meant to limit the instant invention, however, in that alignment 110' may receive individual such connectors which are not so held. One such example of an adapter is defined in U.S. Pat. No. 4,953,929 (J. F. Basista et al), assigned to the same assignee as the present invention. This patent is thus incorporated herein by reference.

One of the orifices within alignment member 110' may also include shutter means therein which operate similarly to the shutter means defined in the embodiment of FIGS. 1-3. In FIG. 4, this shutter means is represented by the numeral 141' with the corresponding biasing spring represented by the numeral 43'. As stated, only one of these orifices need contain shutter means therein. This is because only one of the devices contained within housing 17 is designed for emitting high intensity light therefrom (the other being a receiver for light conversion). The opening (136') designed for receiving the optical connector and associated cable for such a receiver member is thus void of such shutter means.

In the embodiment of FIGS. 5 and 6, housing 17 is shown to include a base portion 19' and corresponding cover portion 21' which mate to contain a substrate member 27 therein in much the same manner as described above for the two-part housing in FIGS. 1-3. The housing in FIGS. 5 and 6, however, further includes a third portion 151 which, as shown, is specifically designed for having the invention's optoelectronic devices 31 and 33 loosely positioned therein. Thus, third portion 151 includes therein receptacle portions 153 each for accommodating a respective device. Third portion 151, as further defined below, provides the aforedescribed several advantageous features (e.g., ease of assembly) while further providing enhanced thermal protection between devices 33 and the heat-generating circuit components on substrate 27. This latter capability is accomplished by the provision of a quantity of thermal insulating material 163 (e.g., a polyimide coating) along the surfaces of the third portion 151 which engage corresponding internal surfaces of the mated base and cover portions 19' and 21' (FIG. 6). These three surfaces are best seen in FIG. 6. By providing a thermal barrier at this location of intersection between these parts of the housing, larger amounts of heat generated by the assembly's circuit components (e.g., chips) will pass primarily through the base and cover portions 19' and 21', thereby substantially reducing the heat exposure to the contained devices within third portion 151. Third portion 151, like portions 19' and 21', is preferably metallic (e.g., aluminum, stainless steel or copper). Third portion 151 also preferably includes a pair of projecting studs 152 (only one shown in FIG. 6 ) which each project from a bottom surface of portion 151, as shown in FIG. 6, for being positioned within an opening 154 located within circuit board 15. Two such studs 152 are preferably used, these spaced apart along the illustrated bottom surface. The stud not shown in FIG. 6 is located behind the stud illustrated, and is thus hidden thereby. Studs 152 are preferably held in place within the respective openings 154 by solder 156. Each stud may also be electrically coupled to a ground plane (not shown) within board 15, to thereby electrically ground third portion 151. Studs 152 also function to securedly position the assembly of the invention onto board 15. Similar studs may also be used to secure the assemblies in FIGS. 1-3 and 4, these projecting from appropriate locations on the bottom surfaces of base portions 19.

As shown in FIG. 5, third portion 151 includes upstanding sidewalls 165 which define the alignment member channel 171 therein. The inner width dimensions for channel 171 may be similar to those for channel 111 in the embodiment of FIGS. 1-3. Third portion 151 further is shown to include the opening 173 therein designed to accommodate the protruding portion (not shown) of the insert member to be positioned therein. It is understood, of course, that third portion 151 is specifically designed to receive the same alignment members as shown in FIGS. 1-3 and 4. Finally, third portion 151 also includes an aperture 177 therein designed for aligning with a corresponding aperture within alignment member 110 whereupon a plug member such as plug 131 in FIG. 1, may be utilized to finally secure the alignment member in position.

Assembly of the invention of FIGS. 5 and 6 is accomplished similarly to that of assembly 10 in FIGS. 1-3. That is, substrate 27 is positioned within base portion 19'. Subsequently, however, the third portion 151, having the optoelectronic devices 31 and 33 loosely inserted therein, is aligned on base portion 19' (e.g., using mating rib and slot structures 181 and 183, respectively) such that the third portion 151 is precisely aligned on the base. Once fully positioned on the base, attachment of the flexible cables from each device is achieved. Following this attachment, the housing's cover portion 21' is then secured to base 19', aligning on the third portion through appropriate alignment structure (e.g., rib elements 185 which mate with corresponding slots 183). The cover, so aligned, is now fixedly attached (e.g., welded) to the housing's base 19'. The invention as assembled is thus ready to receive alignment member 110 whereupon final assembly can be accomplished.

The aforedescribed tongue-and-groove engagement between the three parts of housing 17 further provides added electrostatic discharge protection for the completed assembly, in addition to assuring precise alignment between these parts as needed.

Housing 17, as defined, is preferably of metallic material. The aforementioned close tolerancing between various surfaces thereof is further assured by providing each of these pieces of molded construction. Alignment member 110, unlike housing 17, is preferably plastic and, like housing 17, also preferably of molded construction to assure close tolerances of the various critical dimensions, both internal and external, thereof. In one example, alignment member 110 was comprised of aluminum nitrite filled polycarbonate. Alignment member 110 is also of insulative material in order to provide electrical noise protection against various structural elements (e.g., supportive bracketing, not shown) which may function as a noise source in the operating overall system using the present invention. The preferred flat, flexible cable 51 for use with the invention comprises a dielectric polyimide having the desired conductors located (e.g., screened) on a designated surface thereof, such conductors being copper. Other flexible, flat cables may also be used for the invention.

Thus it has been shown and described an optoelectronic assembly which is capable of operating at relatively high frequencies to provide effective bidirectional data transmission between appropriate fiber optic means and an associated electrical circuit member such as a printed circuit board having desired layers of circuitry therein. The invention as defined is particularly adaptable to using various integrated circuit (IC) semiconductor devices (chip) in combination with selected discreet components such as resistors and capacitors to provide the analog and digital electrical functions desired. The invention as produced in accordance with the teachings herein, in one example, was able to transmit and receive serial optical data at a rate greater than about 1.06 gigabits per second, using a 1300 nm long wave length laser diode and a photodetector, both coupled to single mode fiber optic cable. More particularly, the invention was able to provide such high capacities while maintaining the light emitting and receiving components in critical alignment therein with the various external structures (optic means) which operate with the invention. The invention is also adaptable to mass production to thereby take advantage of the cost reductions associated therewith.

While there have been shown and described what are at present considered the preferred embodiments of the invention, it will be obvious to those skilled in the art that various modifications and changes may be made therein without departing from the scope of the invention as defined by the appended claims.

What is claimed is:

1. In an optoelectronic assembly for providing bidirectional data transmission between fiber optic means including a connector housing having at least one optical fiber member therein and an electrical circuit member wherein said assembly includes a housing, a substrate member substantially positioned within said housing of said assembly and adapted for being electrically coupled to said electrical circuit member, at least one optoelectronic device substantially positioned within said housing and electrically coupled to said substrate member, the improvement wherein said optoelectronic device is initially substantially movably positioned within said housing, said assembly further including a separate alignment member for being secured to said housing in fixed alignment therewith and adapted for having said connector housing of said fiber optic means positioned therein, said alignment member adapted for engaging said substantially movably positioned optoelectronic device to securedly position said device with said housing of said assembly in fixed alignment with said alignment member such that said optical fiber member of said fiber optic means and said optoelectronic device are in precise alignment with said alignment member is secured to said housing of said assembly.

2. The improvement according to claim 1 wherein said housing of said assembly comprises a base portion and a cover portion, said substrate member being positioned on said base portion and said cover portion being positioned on said base portion to provide a cover for said substrate member.

3. The improvement according to claim 2 further comprising a flexible cable member for providing said electrical coupling between said optoelectronic device and said substrate member.

4. The improvement according to claim 3 wherein said base portion of said housing of said assembly includes means for engaging said flexible cable member to substantially hold said cable member against said substrate member prior to and during said electrical coupling.

5. The improvement according to claim 4 wherein said means for engaging said flexible cable member comprises a pair of upstanding side walls defining a slot therebetween, said flexible cable member being positioned within said slot.

6. The improvement according to claim 2 wherein said housing of said assembly further includes a third portion connected to said base and cover portions, said optoelectronic device being initially movably positioned within said third portion.

7. The improvement according to claim 6 further including means for substantially thermally insulating said third portion of said housing of said assembly having said optoelectronic device therein from said base and cover portions of said housing.

8. The improvement according to claim 7 wherein said means for substantially thermally insulating comprises a quantity of insulation material disposed within said housing of said assembly substantially between said third portion and said base and cover portions.

9. The improvement according to claim 8 wherein said insulation material is polyimide.

10. The improvement according to claim 1 wherein said housing of said assembly includes an opening therein, said alignment member including a protruding portion adapted for being positioned within said opening.

11. The improvement according to claim 10 further including a first aperture within said housing of said assembly relative to said opening, said protruding portion of said alignment member including a second aperture therein, said first and second apertures being aligned when said protruding portion is positioned within said opening.

12. The improvement according to claim 11 further including a plug member adapted for being positioned within said first and second apertures when said protruding portion of said alignment member is positioned within said opening of said housing of said assembly and said apertures are aligned, said plug member assisting in maintaining said alignment member in said fixed alignment with said housing of said assembly.

13. The improvement according to claim 1 wherein said alignment member includes at least one orifice therein adapted for having said connector housing of said fiber optic means positioned therein.

14. The improvement according to claim 13 further including at least one shutter member positioned within said alignment member for substantially preventing passage of light through said orifice when said connector housing of said fiber optic means is not positioned within said orifice.

15. The improvement according to claim 14 further including means for biasing said shutter in a closed position wherein said passage of light through said orifice is substantially prevented.

16. The improvement according to claim 15 wherein said means for biasing said shutter comprises a spring.

17. The improvement according to claim 1 wherein said housing of said assembly is metallic and said alignment member is plastic.

18. The improvement according to claim 1 wherein said housing of said assembly defines a channel therein, said alignment member being positioned within said channel.

19. An optoelectronic housing comprising:
a base portion adapted for having a substrate member positioned thereon;
a cover portion adapted for being positioned on said base portion to provide a cover for said substrate member when said substrate member is positioned on said base portion; and
a third portion adapted for being connected to said base and cover portions and for having at least one optoelectronic device substantially loosely positioned therein to facilitate electrical connection of said optoelectronic device to said substrate when said third portion is connected to said base portion, said third portion further adapted for receiving a housing therein for being positioned in fixed alignment therewith.

20. The optoelectronic housing according to claim 19 further including means for substantially thermally insulating said third portion from said base and cover portions.

21. The optoelectronic housing according to claim 20 wherein said means for substantially thermally insulating comprises a quantity of insulation material disposed within said housing substantially between said third portion and said base and cover portions.

22. The optoelectronic housing according to claim 21 wherein said insulation material is polyimide.

23. The optoelectronic housing according to claim 19 wherein each of said base, cover and third portions of said housing is metallic.

* * * * *

UNITED STATES PATENT AND TRADEMARK OFFICE
CERTIFICATE OF CORRECTION

PATENT NO. : 5,202,943

DATED : April 13, 1993

INVENTOR(S) : Gary R. Carden et al.

It is certified that error appears in the above-identified patent and that said Letters Patent is hereby corrected as shown below:

Col. 12, line 22 (claim 1) -- after "position said device", delete "with" and add --within--.

Col. 12, line 26 (claim 1) -- after "in precise alignment", delete "with" and add --when--.

Signed and Sealed this

Twenty-eighth Day of December, 1993

Attest:

BRUCE LEHMAN

Attesting Officer    Commissioner of Patents and Trademarks